United States Patent [19]

Illing

[11] Patent Number: 5,169,582
[45] Date of Patent: Dec. 8, 1992

[54] METHOD AND APPARATUS FOR THE PRODUCTION OF THERMOPLASTIC CAPROLACTAM CONTAINING MOLDING COMPOSITIONS

[75] Inventor: Gerhard Illing, Gross-Umstadt, Fed. Rep. of Germany

[73] Assignee: EMS-Inventa AG, Zurich, Switzerland

[21] Appl. No.: 406,199

[22] Filed: Sep. 11, 1989

Related U.S. Application Data

[63] Continuation-in-part of Ser. No. 860,278, May 6, 1986, abandoned.

[30] Foreign Application Priority Data

May 8, 1985 [DE] Fed. Rep. of Germany ....... 3516434

[51] Int. Cl.⁵ .............. B29C 47/00; C08L 77/00; C08F 2/00
[52] U.S. Cl. .................. 264/141; 264/13; 264/101; 264/102; 264/143; 264/211.13; 264/211.23; 264/211.24; 264/571; 264/DIG. 61; 264/DIG. 78; 524/538; 525/53; 525/178; 525/183; 525/184; 526/65; 526/66; 526/68; 528/318; 528/323
[58] Field of Search .............. 528/318, 323; 526/65, 526/66; 264/101, 102, 141, 143, 211.13, 211.23, 211.24, DIG. 61, DIG. 78, 13, 571; 525/53, 178, 183, 184, 432

[56] References Cited

U.S. PATENT DOCUMENTS

| | | | |
|---|---|---|---|
| 2,361,717 | 10/1944 | Taylor et al. | 526/71 |
| 3,578,640 | 5/1971 | Twilley et al. | 528/323 |
| 3,704,100 | 11/1972 | Twilley et al. | 528/318 |
| 3,900,450 | 8/1975 | Jaswal et al. | 525/432 |
| 4,060,517 | 11/1977 | Merks et al. | 526/65 |
| 4,204,049 | 5/1980 | Matthies et al. | 528/318 |
| 4,310,659 | 1/1982 | Yates et al. | 526/65 |
| 4,429,107 | 1/1984 | Strehler et al. | 528/318 |
| 4,539,391 | 9/1985 | Pipper et al. | 528/323 |
| 4,642,211 | 2/1987 | Elbs et al. | 264/143 |

Primary Examiner—Ana L. Carrillo
Attorney, Agent, or Firm—Jordan and Hamburg

[57] ABSTRACT

In a method and apparatus for the production of thermoplastic, caprolactam containing molding compositions by hydrolytic polymerization of caprolactam in stirrer autoclaves in which a molten mass is polymerized at pressures of 5 to 20 bar and temperatures of 220° to 280° C., the molten mass is transferred into an intermediate vessel to which vacuum is applied for continued polymerization and removal of volatile portions. Subsequently, the mass is continuously fed into a multiscrew extruder, in order to attain at increased temperatures and vacuum the desired polymerization degree and the desired monomer and oligomer contents. In a subsequent zone of the extruder, when desired, additional agents are worked in, whereafter a further degasification occurs in the end zone of the extruder, whereafter the mass is extruded, quenched, subdivided and dried. The method and apparatus use relatively little energy as compared with the prior art.

9 Claims, 4 Drawing Sheets

METHOD AND APPARATUS FOR THE PRODUCTION OF THERMOPLASTIC CAPROLACTAM CONTAINING MOLDING COMPOSITIONS

This application is a continuation-in-part of application Ser. No. 860,278, filed May 6, 1986.

BACKGROUND OF THE INVENTION AND RELATED ART STATEMENT

The invention relates to a method and an apparatus for the production of thermoplastic caprolactam, i.e., nylon-6, containing molding compositions by hydrolytic polymerization of caprolactam in a plurality of autoclaves at pressures of up to 20 bar and temperatures up to at least 240° C. in the presence of water and a weak acid, whereafter the molten mass is transferred out of the autoclaves into an intermediate vessel to which vacuum is applied for continued polymerization and for the removal of volatile components such as water, monomeric caprolactam and oligomers.

The above-mentioned method step with the use of a single autoclave are known from DD-PS 4,735, which relates to a method for the production of linear polyamides in two discontinuous steps. An extrusion or a processing into molding compositions is not provided.

Polyamide molding compositions are normally produced in the following way. In the first step, the caprolactam is melted down and either polymerized entirely continuously in a VK-tube or discontinuously in an autoclave, whereat other polyamideformers, for instance lauryllactam, or adipic acid or sebacic acid and the equivalent quantity of hexamethylene diamine are added. The caprolactam containing monomer mixture is thereby under nitrogen atmosphere heated to 220° to 280° C., whereby the pressure can increase to 20 bar. After 6 to 8 hours, the polyamide molten mass at 220° to 250° C. is extruded into strands, quenched and granulated. The polycaprolactam containing raw polymer obtained in this way contains 10 to 11% by weight monomeric caprolactam in relation to the total quantity of polymeric caprolactam. By means of washing the polymer with a 3 to 10-fold quantity of hot water in relation to the polyamide, the monomeric and low molecular weight and oligomeric portions are extracted. The raw polymer saturated with moisture is subsequently dried.

The energy requirement of the above-mentioned multiple-step method, among others, is very unfavorable, as is shown by the following. In order to melt down and to heat 1 kg caprolactam to the aforementioned temperatures, there are required approximately 300 kcal. During the polymerization, a reaction heat of approximately 100 kcal/kg is released, so that for the polymerization, there are required approximately 200 kcal/kg caprolactam. For the extraction of 1000 kg polycaprolactam, there are required 2800 l boiling-hot water in an energy-conserving countercurrent process. The polycaprolactam to be extracted is thereby at first treated with caprolactam containing washing liquor and finally with pure water. For heating this quantity of water from 12° to 100° C., there are required 88 kcal/l, that is, for the 2800 l, 0.10234 kWh×2800 =286.5 kWh. For recovering the caprolactam, the aqueous solution has to be distilled. This requires 2000 kWh, which is calculated as follows: the heat of evaporation of 1 kg water is 539 kcal, which is equal to 0.6268 kWh, that is, for the 2800 l, 0.6268 kWh×2800=1755 kWh. For cooling down again the distilled water from 100° C. to 25° C., there is required either costly fresh water or an additional 75 kcal×2800 l=244 kWh and for the distillation of 100 kg caprolactam at 12 to 15 hPa in a thin-layer evaporator another 35 kWh, so that for the washing and extracting of 1000 kg polycaprolactam containing raw polymer, for the distillation of the lactam containing water and the caprolactam, there are required a total of 2500 to 2800 kWh, depending on the magnitude of the heat losses by radiation. Without the use of the countercurrent principle in the extraction, the energy consumption is two to three times higher (see *Kunststoffhandbuch*, Munich, 1966, volume VI, p. 190 to 194; DE PS 25 03 308).

After the extraction, further energy is required for drying the granules. The most economical way for doing this is in a vacuum dryer within 36 hours at 70° to 90° C. For drying 1000 kg polyamide, there are required at least 270 kWh, because for the evaporation of the water, there are required 539 kcal/kg=0.63 kWh/kg. The washed and pre-dried polyamide contains approximately 14% water; 1000 kg thus contain 140 kg water, so that for drying to a water content below 0.1%, there are required 140×0.63=88.2 kWh. In addition, there is also required driving energy for the vacuum tumble-dryer, which requires at least 3 kWh/1000 kg polyamide×36 hours=108 kWh For the vacuum pump, there are required another 36×2 kWh =72 kWh/1000 kg. This gives a total of 268 kWh, effectively 280 to 300 kWh due to heat losses and radiation. In order to obtain a marketable caprolactam containing thermoplastic molding material, the extracted and dried polyamide has to be melted down in an extruder, so that pigments, additives and, when required, fillers can be worked in. For this process, the empirically determined energy requirement is approximately 300 to 380 kWh/1000 kg nylon-6 molding material This value can be calculated from the heat of fusion for nylon-6=0.019445 kWh/kg and the heating and driving energy requirement of the extruder of 280 to 300 kWh/ton polyamide. Therefore, according to the conventional method, per ton of end product, there have to be expended a total of approximately 3050 to 3460 kWh/1000 kg nylon-6.

In individual cases, it has already been attempted to shorten this multiple-step process to effect energy savings (see EP - PS 0005 466). It has already been proposed to arrange behind the VK-tube a twin-shaft extruder and to make the method continuous. However, the extruder is proposed only as a worm evaporator as an alternative to the conventional thin-layer evaporators for the degasification. No other possibilities are provided. In addition, the therein intended use of a VK-tube does not permit any production of variants, but limits it to a pure polycaprolactam of relatively low melt viscosity. These materials are suitable for the production of monofilms, but not for the production of highly impact resistant or reinforced injection molded molding materials.

SUMMARY OF THE INVENTION

Starting from the principle of the initially mentioned method, the object of the present invention is to provide at the greatest possible energy savings, without melting down again and without extraction of the monomers with water a quasi-continuous process for the production of thermoplastic polyamides, especially an assortment of the most variously finished ready-to-use injection molding compositions, including a production apparatus suited for this purpose.

The above-mentioned object according to the method of the invention is solved in that the polymerization in the main step is discontinuously performed in autoclaves with stirring equipment at temperatures of 220° to 280° C., that the intermediate vessel is essentially quasi-continuously charged from more than one autoclave, that the material arrives continuously from the intermediate vessel into a multiple-screw extruder with segmented screws and barrel which can be heated differently, that the material therein is brought by means of increased temperatures and vacuum to the desired polymerization degree and the desired monomer content and a subsequent extruder is provided at which to the melt are added molding composition modifying agents, such as lubricants, heat stabilizers, pigment, filler and reinforcing agents, plasticizers and elasticizers, whereafter a further degasifiying occurs in the end zone of the extruder and whereupon the material is extruded and, when desired, granulated.

Accordingly, the method according to the invention, including the energy requirements, is as follows. The caprolactam containing monomer mixture to be polymerized is polymerized in a plurality of autoclaves each provided with a stirrer, for which, as described above, there are required approximately 200 kcal for the polymerization of 1 kg caprolactam. After a polymerization time of 8 to 12 hours, the polyamide melt, at 220° to 280° C., is pumped via an intermediate vessel, to which vacuum is applied, to an extruder, whereby 8 to 9% of caprolactam in reference to the fed quantity of polycaprolactam is evaporated in vacuum. The use of a plurality of autoclaves in parallel permits a quasi-continuous operation. While the polyamide melt of one autocalve is being discharged, the polymerization reaction takes place in the other autocalves. For example, when two autoclaves connected in parallel to the intermediate vessel are used, the cycle of the two autocalves is so timed that after 8 to 12 hours, the polyamide melt from one of the autoclaves is discharged into the intermediate vessel while the polymerization process in the other vessel is progressing toward the end of its 8 to 12 hour period. By the time the discharging of the contents of the first autoclave from the intermediate vessel to the extruder is approaching its conclusion, the polymerization process in the second autoclave has come to an end and the contents of the second autoclave begin being discharged into the intermediate vessel so that there is a continuous supply of polyamide melt from the intermediate vessel to the extruder. The hot caprolactam vapor resulting from evaporation in the intermediate vessel is condensed and the caprolactam recovered. The energy requirement is negligibly small While the hot polyamide melt passes through the extruder, there are added to it all molding composition modifying agents, namely pigments, additives, reinforcing agents, master batches, modifier agents, etc. Thus, in a quasi-continuous method, there are obtained dyed and modified polycaprolactam containing, thermoplastic molding compositions. In comparison to the known and up to now technically carried out methods for the production of these materials, there are no longer required the washing and extracting, the drying, melting down again and recycling the extraction water. The new method requires for the polymerization 200 kcal/kg caprolactam=230 kWh/1000 kg nylon-6 and for the extrusion, including the vacuum delactamization and pelletization another 150 to 200 kWh/1000 kg polyamide molding composition, for a total of 380 to 430 kWh/1000 kg molding composition. Effectively, the new method requires 500 to 600 kWh for the production of 1000 kg molding composition. This results in a total energy saving of at least 2500 kWh/1000 kg compared to the methods known up to now by means of savings in the expenditures for the extracting and for the reclaiming of the caprolactam as well as for the drying and the renewed melting down Another advantage of the method according to the invention is the possibility of producing caprolactam containing, thermoplastic molding compositions with a defined or desired monomer content. After the up to now used washing methods, there were obtained molding compositions which practically no longer contained any monomer. The content was clearly below 1%, usually below 0.5%, after the melting down again in the extruder. According to the method of the invention, there can be produced molding compositions with a desired content of monomer in the range of 0.5 to 10%, preferably 1 to 8% by weight. At a monomer content of 1.5 to 3% by weight, the dry impact resistance is clearly increased without the product exhibiting exudation of caprolactam by water absorption. Although higher lactam contents further improve the impact resistance, these products are only usable for applications in a humid environment, whereby the effloresced caprolactam is dissolved and replaced by intercalating water.

The molding compositions produced according to the method of the invention have a higher level of physical properties, in particular because there does not occur any thermal damage as occurs due to melting down again as required in the prior art multi-step process.

Another object of the invention is apparatus for the execution of the above described method of the invention for the production of thermoplastic, caprolactam containing molding compositions by hydrolytic polymerization of caprolactam, in which a plurality of parallel heatable pressure vessels (autoclaves) are each connected in series to a heatable and evacuatable vessel for the continuation of the reaction with removal of volatile components.

Such apparatus utilizing a single autoclave connected in series to a heatable and evacuatable vessel is known from the above mentioned DD-PS 4,735. Therein is already anticipated the advantage of shortening the reaction time in the autoclave in that the reaction mass is conveyed in a second reaction step to a so-called intermediate point, i.e., a vessel, in which the reaction ends and from which all volatile components, including water, are drawn off under vacuum. This apparatus, however, is suitable only for discontinuous operation and for laboratory use There is also lacking the possibility of removing volatile materials, at least water, already in the first reaction step, so that the reaction is occurring with a poor yield of higher molecular polyamides. The products, in any case, seem to be suitable for the spinning process.

These disadvantages are overcome by the apparatus according to the present invention which allows, in particular, a quasi-continuous production of polyamide molding compositions. It is characterized by (a) at least two parallel arranged heatable stirrer autoclaves;

(b) a heatable and evacuatable intermediate vessel which can be alternatingly charged by one or another stirrer autoclave and which, at the discharge side, is provided with a conveyor means which empties into an extruder; and (c) a screw extruder with at least one drive and at least two screw shafts, provided with screw segments and kneading segments as well as a barrel having heatable segments Hereinafter, the invention will be more closely explained by means of exemplary embodiments from which further advantages and characteristics of the invention be seen.

In this specification, from time to time reference may be made only to a single autoclave in describing the invention. It is to be understood, however, that this is merely for the sake of convenience. A feature of the present invention is always quasi-continuous operation, resulting from alternatively feeding polyamide melt from a plurality of autoclaves connected in parallel to the intermediate vessel. What occurs in each autocalve considered individually is the same. Consequently, it is convenient at times to refer explicitly to only one of the autoclaves.

BRIEF DESCRIPTION OF THE DRAWINGS

In the drawings is illustrated an apparatus for carrying out the method. In particular.

DETAILED DESCRIPTION OF PREFERRED EMBODIMENTS

Figure 1:
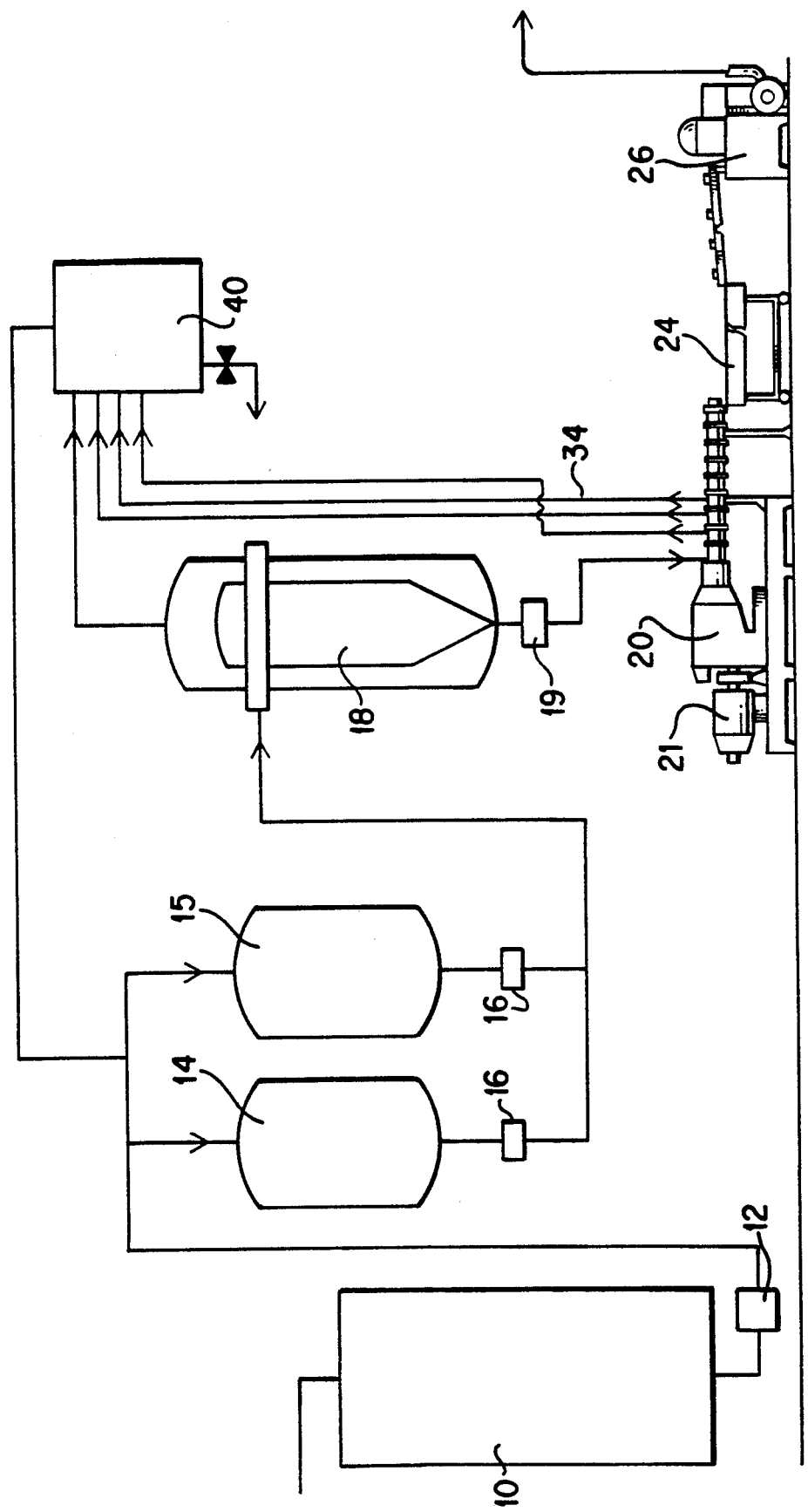
FIG. 1 is a partly schematic illustration of a complete installation according to the invention.

The installation according to FIG. 1 comprises a supply tank 10 for caprolactam. The caprolactam is fed molten, generally at a temperature of 70° to 80° C., and stored at this temperature in the supply vessel 10. A specific, predetermined quantity is pumped by a metering pump 12 into a stirrer autoclave 14 or 15. Further polyamide precursors can be fed via separate means to the stirrer autoclave 14 or 15, in case it is intended to produce copolymers, grafted polymers or sequence polymers. The stirrer autoclaves are heatable to a temperature of 340° C. The polymerization is either manually or automatically controlled according to a given program. The raw polymer is being pumped via a discharge pump 16 into an intermediate vessel 18 which is under vacuum. Therein takes place a secondary condensation, because water and caprolactam and oligomers are being partially removed. The use of the intermediate vessel 18 according to the invention saves residence time in the costly stirrer autoclaves 14 or 15 and permits a higher throughput per investment unit. From here, the pre-devaporized melt is conveyed to a multi-screw extruder 20 which can have either one or two separate drives 21, 22 (FIG. 2) In the extruder 20 are removed monomeric caprolactam and the low molecular weight fractions which are volatile in vacuum at 220° to 280° C. The monomer content can be adjusted via the screw speed, by the residence time in the devaporization zone, by the number of devaporization zones and finally by applying certain degrees of vacuum. In the extruder 20 are added all the necessary additional agents, such as lubricating agents, crystallization accelerators, auxiliary mold release agents, heat stabilizers and other additives, as well as pigments, plasticizers, fillers, such as mineral powders, glass beads or glass fibers. There can also be added other polymers for modification. The polymer melt is intensively kneaded and homogenized with the additional agents. (Preferably, as described hereinbelow, two multiple screw extruders are used.) The melt is extruded into strands, which are briefly quenched in the water bath 24, pelletized in the granulator 26 and conveyed to a drying and emptying silo which is not illustrated. The monomeric caprolactam drawn off in vacuum by the degasification vent 34 and the low-molecular portions (oligomers) are precipitated in a condenser 40 and are supplied again to the process.

Figure 2:
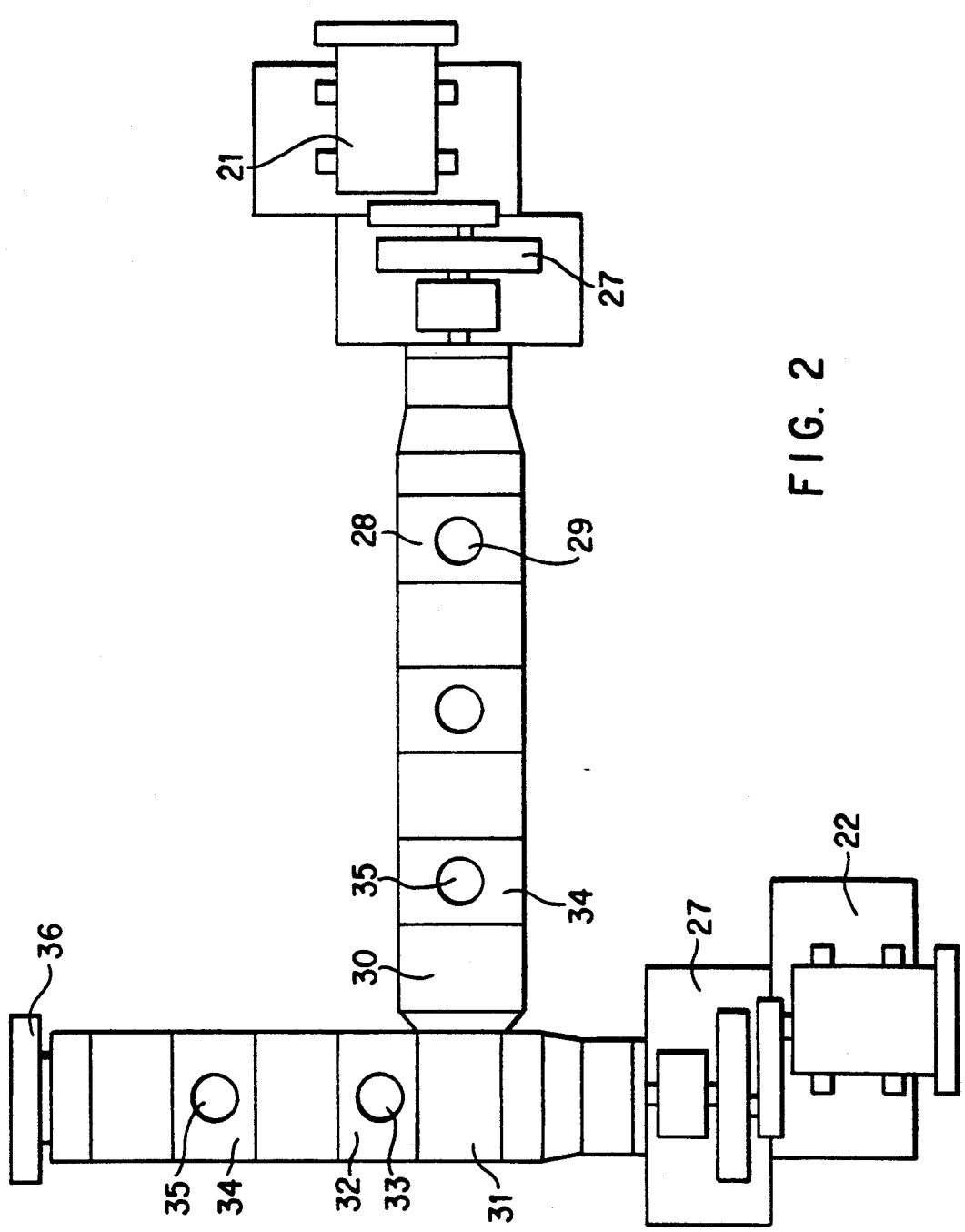
FIG. 2 is a top plan view of a multi-screw angular extruder which can be used in the installation of FIG. 1.

FIG. 2 is a top plan view of two multi-screw extruders having respective drives 21, 22 Between each drive 21, 22 and respective adjacent barrel segment of the extruder there is arranged a respective driving unit 27. The extruders comprise each a mechanical assembly of barrel segments which are either closed, for instance segment 30, or are provided with degasification, i.e., devaporization, openings or feed openings, such as the segments 28, 32, 34. Through the feed opening 29, the polymer melt from the intermediate vessel 18 is fed into the barrel segment 28. The degasification takes place in the barrel segments 34 with the openings 35. More particularly, in FIG. 2, there are two twin-screw extruders, one feeding into the other and connected thereto at right angles. Each of these extruders is referred to herein as an "extruder section." in the first thereof the residual monomer content may be brought down from as low as about 3% by weight of the melt received from the intermediate vessel to as low as 0.5%, and in the second thereof the molding composition modifying agents may be added, where they are intensively kneaded into the polyamide melt, so that a plurality of different polyamide injection molding compositions may be obtained in a quasi-continuous process. In the barrel segments 30 and 31 takes place the transfer to the second extruder section which has a separate drive 22. This extruder section is flange-mounted at an angle, preferably at a right angle, to the first section. It can be driven at a different screw speed. In the barrel segment 32, through the feed opening 33, there can be fed fillers and any other necessary additional agents, as mentioned above. Through the extruder nozzle head 36 the melt is extruded into strands.

Figure 3:
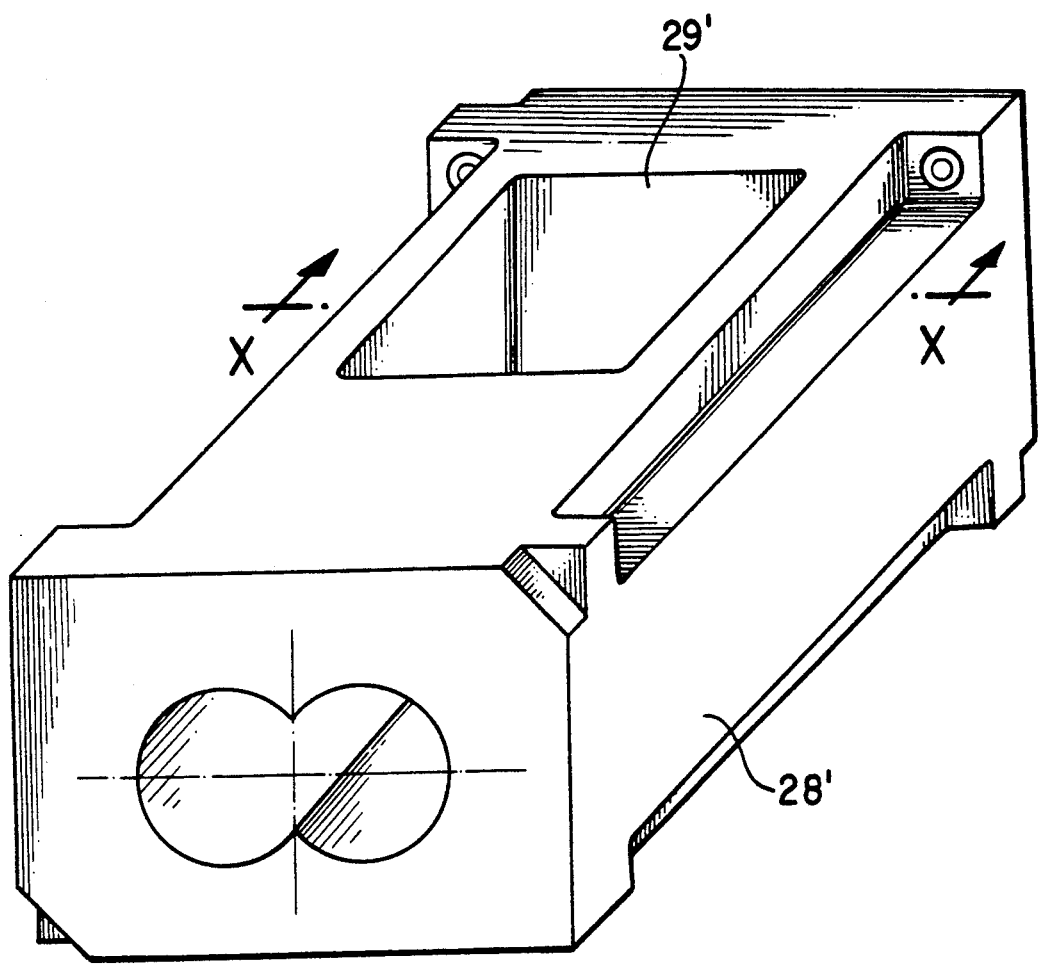
FIG. 3 is a perspective view of an individual barrel segment of an extruder according to the invention.

In FIG. 3, a barrel segment 28' with a feed opening 29', suitable for use as part of an extruder such as extruder 20, is shown in a perspective view, the opening in barrel segment 28' being generally square or rectangular whereas the openings in the barrel segments illustrated in FIG. 1 are circular.

Figure 4:
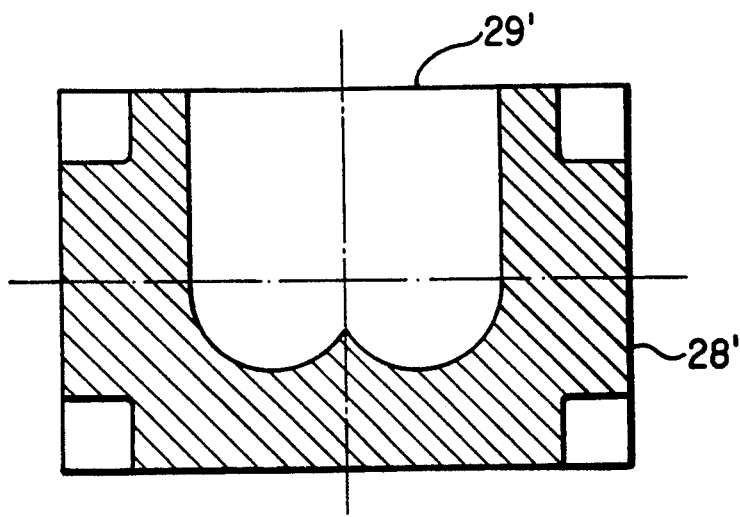
FIG. 4 is a cross-sectional view of the barrel segment of FIG. 3 taken on section line X—X of FIG. 3.

FIG. 4 is a cross-sectional view through the barrel segment 28' taken along the section line X—X shown in FIG. 3.

Figure 5:
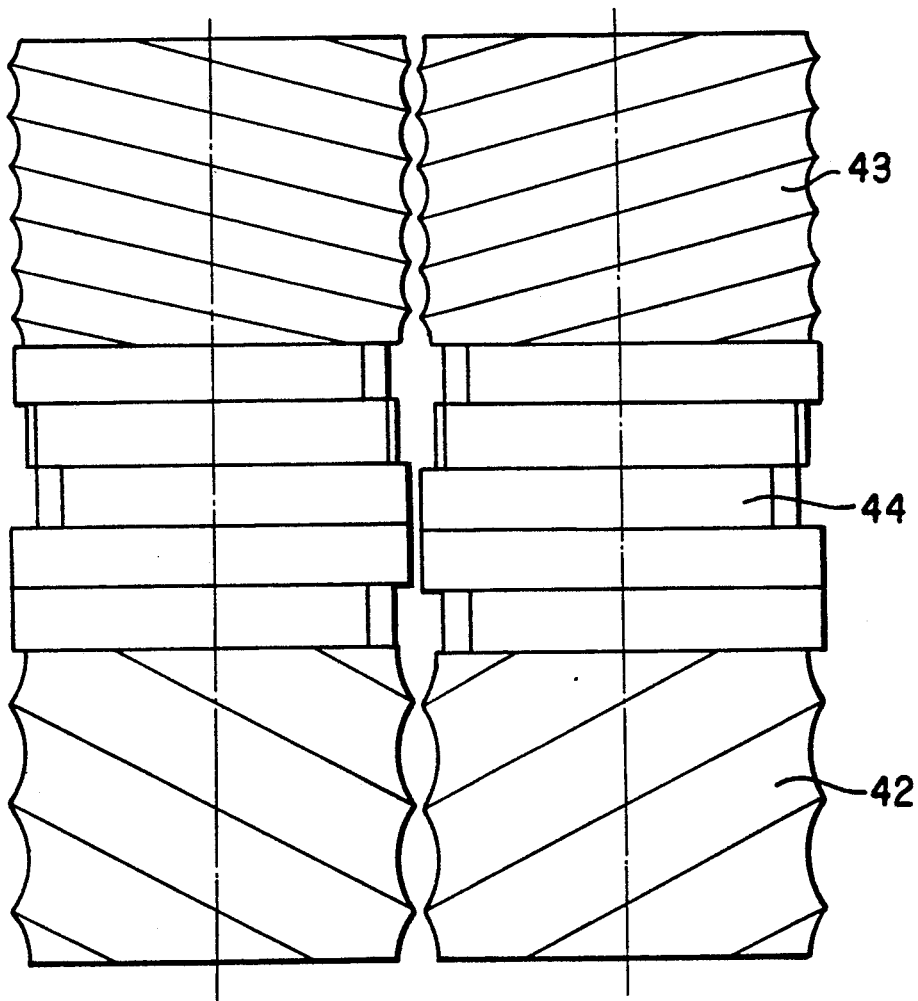
FIG. 5 is a top plan view of a twin screw segment with kneading zone in the center for a multi-screw extruder of FIGS. 1-4.

FIG. 5 is a cutaway segment of the twin-screw conveyor of the extruder 20. It shows the screw segments 42, 43 with different thread pitches for conveying the polymer melt at different rates and/or providing different kneading actions and a kneading block 44 for intensive kneading.

For the method according to the invention for the production of thermoplastic molding compositions, there are used either pure ε-caprolactam or mixtures of ε-caprolactam and other lactams, such as capryllactam, oenanthlacatam or lauryllactam, or ε-caprolactam with other polyamide-formers, such as 11-amino-undecanoic acid or diamines, such as hexamethylenediamine, decaethylenediamine, dodecamethylenediamine, ethylenediamine, 2-methylhexamethylenediamine, trimethyl-hexamethylenediamine, 1,4-xylylenediamine, bis(4-aminocyclohexyl)methane, 1,4-diaminocyclohexane, with the equivalent quantity of dicarboxylic acid as adipic acid, suberic acid, azelaic acid, sebacic acid, decamethylenedicarboxylic acid, heptadecanedicarboxylic acid, 2,2,4- or 2,4,4-trimethyladipic acid, isophthalic acid, terephthalic acid and finally ε-capro- lactam with or without the mentioned polyamide formers and oligomeric or polymeric substances, which enter with ε-caprolactam into a grafting reaction, such as for instance copolymers of ethylene with vinyl acetate or acrylic acid esters, or polyurethanes derived from di- or tri-isocyanates and di- or polyols, such as hexamethylenediisocyanate, toluylene-2,4- or -2,6-diisocyanate, triphenylmethane-4,4',4''-triisocyanate and butanediol-1,4, hexanediol-1,6, polytetrahydrofuran, polypropyleneglycol or linear and branched polyester alcohols derived from adipic acid and phthalic acid with an excess of diols and triols as well as polyamides or copolyamides.

In the preferred embodiment, the caprolactam is polymerized in the autoclaves in the presence of at least one of polylauryllactam and polyaminodecanoic acid to form caprolactam copolymers or graft copolymers.

In another preferred embodiment, fed into the polycaprolactam containing molten mass in the extruder is a polymer which forms a graft copolymer with polycaprolactam. The graft copolymer forming polymer is preferably fed into the extruder upstream of the intensive kneading zone and preferably is selected from the group consisting of ethylene acrylic acid copolymers and esters and salts thereof, nitrile rubber, ethylene-propylene rubber and ethylene propylene rubber modified with maleic anhydride.

According to another novel feature of the method of the invention, polyamide injection molding compositions can be prepared with very different and in each case desirable monomer contents at any value of 0.5 to 10% by weight. On the other hand, pursuant to the prior art methods, the polycaprolactam coming out of the autoclave or vacuum tube contained 10 to 11% monomer and, after the washing process, was practically free of monomer. In other words, one was not able to adjust the monomer content to intermediate values. Vacuum delactamizers of the prior art, obtainable, for example, from the Zimmer Company, permit the monomer content to be reduced only to 3% since an equilibrium is point of polycaprolactam. Only by means of the extremely short residence times of about 40 to 90 seconds of the polycaprolactam melt in the degassing extruder in the present invention has it become possible to reduce the monomer content to selected levels as low as 0.5% and, if desired, to remove all traces of monomer.

EXAMPLE 1

4,000 kg molten caprolactam at 75 to 80° C. is pumped from the supply vessel 10 to a 5,000 liter heatable and nitrogen-flushed stirrer autoclave 14. Thereto is added 200 liters water containing 10% caprolactam (20 kg) and 0.3% acetic acid (0.6 kg). With stirring and under a nitrogen blanket at a pressure of 5 bar, the preparation is heated within 4 hours to 260° to 265° C., whereby the pressure increases to 12 to 18 bar. This pressure and temperature are subsequently maintained for 2 hours; thereafter, the pressure is reduced to 0 bar by means of slowly relieving of the pressure within 2 to 4 hours. The product temperature is thereby reduced to 235° to 240° C. Subsequently, the melt is pumped into an intermediate vessel 18 to which 36 to 60 hPa vacuum is applied. The melt being extensively freed from volatile portions is conveyed via a metering pump 19 into a twin-screw extruder 20 with different screw segments and barrel segments. Depending on the screw speed, the number of degasification openings and the set vacuum, there is obtained a polycaprolactam with a relative solution viscosity (the relative solution viscosity is determined from a 1% solution of polycaprolactam in 90% formic acid at 20° C. according to DIN (German Industrial Standard) 53 727) of 2.3 to 4.2 and a content of monomeric and dimeric caprolactam of 0.4 to 10%. The portions of monomeric and oligomeric caprolactam is determined by extraction with methanol according to DIN 53,738. The low-molecular portions removed from the polymer melt by the vacuum are precipitated in a condenser 40 and are supplied again to the next preparation. The extract contents, the relative solution viscosity and a few characteristic values of the properties are indicated in Table 1.

TABLE 1

Property values of raw nylon-6 with different monomer and oligomer contents of the caprolactam (moisture content of samples: 0.08 to 0.09%); mean values, measured on freshly extruded test bodies after 24-hour storage at 23° C.

| | | | | | | |
|---|---|---|---|---|---|---|
| Extractable portions (%) | 0.48 | 1.42 | 2.31 | 3.23 | 4.15 | 4.95 |
| K-value DIN 53727 | 77.2 | 75.9 | 75.3 | 74.6 | 73.8 | 73.0 |
| rel. solution viscosity | 3.01 | 2.90 | 2.85 | 2.80 | 2.75 | 2.69 |
| tensile strength DIN 53455 (N/mm²) | 70 | 70 | 69 | 66 | 65.5 | 64.6 |
| elongation at break DIN 53455 (%) | 98 | 138 | 160 | 172 | 185 | 218 |
| impact strength (throughnotch d = 3 mm) (kJ/mm²) DIN 53753 | 58 | 69 | 78 | 85 | 82 | 101 |
| E-modulus (bending test) DIN 53457 (N/mm²) | 2800 | 2680 | 2600 | 2550 | 2420 | 2330 |

EXAMPLE 1A

The process s initially as in Example 1. To the delactamized polycaprolactam melt are programmedly added by means of synchronizedly controlled metering conveyor type weighers through the barrel segment 32 of the extruder with an upward pointing opening 33 and a laterally extending cavity (identical to barrel segment 28 shown in FIGS. 3 and 4), all the required additional agents, such as lubricants, heat stabilizers, pigments, fillers, such as glass beads, glass fibers, mineral fillers, and, if required, polymers which are capable of an alloy-formation. The thus obtained polycaprolactam containing molding compositions are summarized in Table 1A.

TABLE 1A

Properties of polycaprolactam containing molding compositions reinforced with different fillers

| Property Test Standard | Units | Product Polycaprolactam with 1.56% extractable portions and addition of | | |
|---|---|---|---|---|
| | | 25% glass fibers | 40% carbon fibers | 30% kaolin |
| Tensile strength DIN 53 455 | N/mm² | 150–160 | 210–230 | 75–80 |
| elongation at break DIN 53 455 | % | 5–7 | 5–6 | 8–10 |
| E-modulus (bending test) DIN 53 457 | N/mm² | 6800–7000 | 20000–23000 | 4500–5000 |
| impact strength DIN 53 453 | kJ/m² | 45–55 | 35–45 | not used |
| ball-indentation hardness DIN 53 456 | N/mm² | 105–110 | 225–235 | 120–125 |
| density DIN 53 470 | g/cm³ | 1.30 | 1.35 | 1.36 |
| viscosity number DIN 53 727 | ml/g | 140–160 | 145–160 | 140–165 |

EXAMPLE 2

In a 5000 l heatable pressure vessel, there are placed 1200 kg of a salt of equimolar quantities of adipic acid and hexamethylenediamine (AH-salt), 800 kg water and 1200 kg caprolactam as well as 2 liters 50-% aqueous acetic acid. The pressure vessel is closed and flushed with nitrogen, then a blanket of nitrogen at 2 bar pressure is forced into the vessel and the preparation is heated within 4 hours to 210° to 220° C. The pressure increases to 16 and 18 bar. As soon as the reaction mixture is completely melted down, the agitating mechanism is turned on. Pressure and temperature are kept constant for 1 to 2 hours, so that a crude condensate can form. Subsequently, the temperature is increased to 275° C. and the pressure is kept at 16 to 18 bar by means of opening the pressure-relieving valve, whereby the water distills off. Subsequently, the pressure is reduced to 1 to 2 bar for 1 to 2 hours and the temperature is decreased from 275° to 245° C. As described in Example 1, the degasified melt is pumped into an intermediate vessel, and by applying a vacuum of 40 to 60 hPa, the melting viscosity is brought to a desired value. (The melting viscosity is determined by means of a rotational viscosimeter.) The copolyamide melt is pumped into a twin-screw extruder Therein, in a first degasification step at 55 to 60 hPa, and in a second degasification step at 30 to 35 hPa at a temperature of the melt of 250° to 260° C., the volatile portions are removed and condensed. The melt freed from monomers is kneaded in the extruder into a polycaprolactam containing molding composition while adding to it 3% color batch, 15% chopped glass fibers and 25% of an aluminium silicate, the mass is extruded into strands, which are quenched and pelletized. The thus obtained product has the property values indicated in Table 2.

TABLE 2

Property values of a copolyamide, reinforced with 15% glass fibers and 25% of an aluminium silicate

| Property | Test Standard | Units | |
|---|---|---|---|
| Tensile strength | DIN 53455 | N/mm² | 105–110 |
| elongation at break | DIN 53455 | % | 5–6 |

TABLE 2-continued

Property values of a copolyamide, reinforced with 15% glass fibers and 25% of an aluminium silicate

| Property | Test Standard | Units | |
|---|---|---|---|
| E-modulus (bending test) | DIN 53457 | N/mm² | 6500–6800 |
| impact strength | DIN 53453 | kJ/m² | 35–42 |
| viscosity number | DIN 53727 | ml/g | 140–155 |

EXAMPLE 3

600 kg polylauryllactam powder (rel. solution viscosity 1.56) is put into a 5000 l heatable pressure vessel. Thereto are added 2400 kg molten caprolactam at 75° to 80° C. which contains 12 l water and 0.3 kg propionic acid. The autoclave is closed and thoroughly flushed with nitrogen. Subsequently, a blanket of nitrogen at 5 bar is introduced and the preparation is heated to 260° to 265° C. This temperature is maintained for an hour. Subsequently, the stirring mechanism is turned on and keeps stirring at these reaction conditions for 3 hours longer. Thereafter, the pressure is reduced by slowly relieving it to 0 bar and the product temperature is reduced to 225° to 230° C. The melt is pumped into an intermediate vessel which is under 10 to 15 hPa vacuum. The melt, which is extensively freed from volatile portions, is fed via a metering pump into the first section of the twin-screw extruder, as shown in FIG. 2. The melt is maintained at 225° to 230° C. and is freed from the portions which are volatile at this temperature by means of three degasification zones. The vacuum at the first degasification vent is 55 to 60 hPa, at the second degasification vent 35 to 40 hPa and at the third degasification vent 10 to 15 hPa. The thus degasified melt is conveyed to a crosswise, flange-mounted second section of the extruder of the same screw diameter but having a separate drive. Into the barrel segment 32 through the opening 33 therein there is metered 40% glass fibers. The screw speed in the second extruder section is twice as high as in the first extruder section which is flange-mounted before it, in order to compensate for the increase in volume due to the additional materials. The remaining volatile portions are vaporized out in the barrel segment 34. The glass fiber-reinforced melt of the polycaprolactam containing graft polymer is extruded into strands through the extruder head 36, and the strands are quenched and pelletized. The property values of the thus obtained product are indicated in Table 3.

TABLE 3

Property values of a copolyamide, reinforced with 40% glass fibers

| Property | Testing Standard | Units | |
|---|---|---|---|
| Tensile strength | DIN 53455 | N/mm² | 140–150 |
| elongation at break | DIN 53455 | % | 5–6 |
| E-modulus (bending test) | DIN 53457 | N/mm² | 9000–9400 |
| impact strength | DIN 53453 | kJ/m² | 40–45 |
| viscosity number | DIN 53727 | ml/g | 180–195 |

What is claimed is:

1. Method for the production of thermoplastic caprolactam containing molding compositions comprising hydrolytically polymerizing caprolactam in a plurality of parallel autocalves at pressures of up to 20 bar and temperatures of 220° to 280° C. in the presence of water and a weak acid to form a crude polycaprolactam containing molten mass, alternatingly feeding the molten mass from one or another of the autoclaves to a vessel under vacuum and therein continuing the polymerization and removing from the molten mass as vapor volatile components including water and monomeric and oligomeric caprolactam, then feeding the molten mass from the vessel under vacuum to a multi-screw extruder having a barrel segmented into sequential zones, independently heating and applying vacuum to the zones to advance the polymerization to the desired degree and to lower the monomer and oligomer contents of the molten mass by removing excesses thereof as vapor, feeding molding composition modifying ingredients selected from the group consisting of lubricants, heat stabilizers, pigments, fillers, reinforcing agents, plasticizers and elasticizers into the molten mass in the extruder, in a zone downstream from the feeding of the molding composition modifying ingredients and adjacent the discharge end of the extruder further heating and applying vacuum to lower further the monomer and oligomer contents of the molten mass by removing the residual excesses thereof as vapor, extruding the molten mass at the discharge end of the extruder and quenching the extrudate to solidify it.

2. Method according to claim 1, further comprising pelletizing the solid molding compositions.

3. Method according to claim 1, in which vaporized monomeric and oligomeric caprolactam removed from the vessel under vacuum and the extruder is condensed and, together with fresh caprolactam, is fed to the autoclaves.

4. Method according to claim 1, in which the pressure at the head of the extruder is maintained at 5 to 50 bar and the temperatures of the molten mass in the extruder are selected to adjust the viscosity of the molten mass so that it passes through the extruder without stopping up or leaking from the extruder or tearing.

5. Method according to claim 1, in which the molten mass in the extruder upstream of the feeding of the molding composition modifying ingredients is propelled by a first screw in the extruder and the molten mass in the extruder downstream of the feeding of the additives is propelled by a second screw in the extruder, the second screw being driven at a higher speed than the first screw to compensate for the increase in volume due to the molding composition modifying ingredients.

6. Method according to claim 1, in which the monomer content is so lowered that the molding composition has a monomeric caprolactam content of 1 to 8% by weight.

7. Method according to claim 1, in which the monomer content is so lowered that the molding composition has a monomeric caprolactam content of 1.5 to 3% by weight.

8. Method according to claim 1, in which the hydrolytic polymerization is in a pair of parallel autoclaves and the feeding of the molten mass to the vessel under vacuum is alternatively from one or the other of the autoclaves.

9. Method according to claim 1, in which the monomer content is so lowered that the molding composition has a monomeric caprolactam content of 0.5 to 10% by weight, whereby the impact strength of the composition is increased.

* * * * *